June 2, 1953        A. R. DE BURGH        2,640,607
MULTIPLE CYCLE CONVEYER
Filed July 26, 1948                                          4 Sheets-Sheet 1
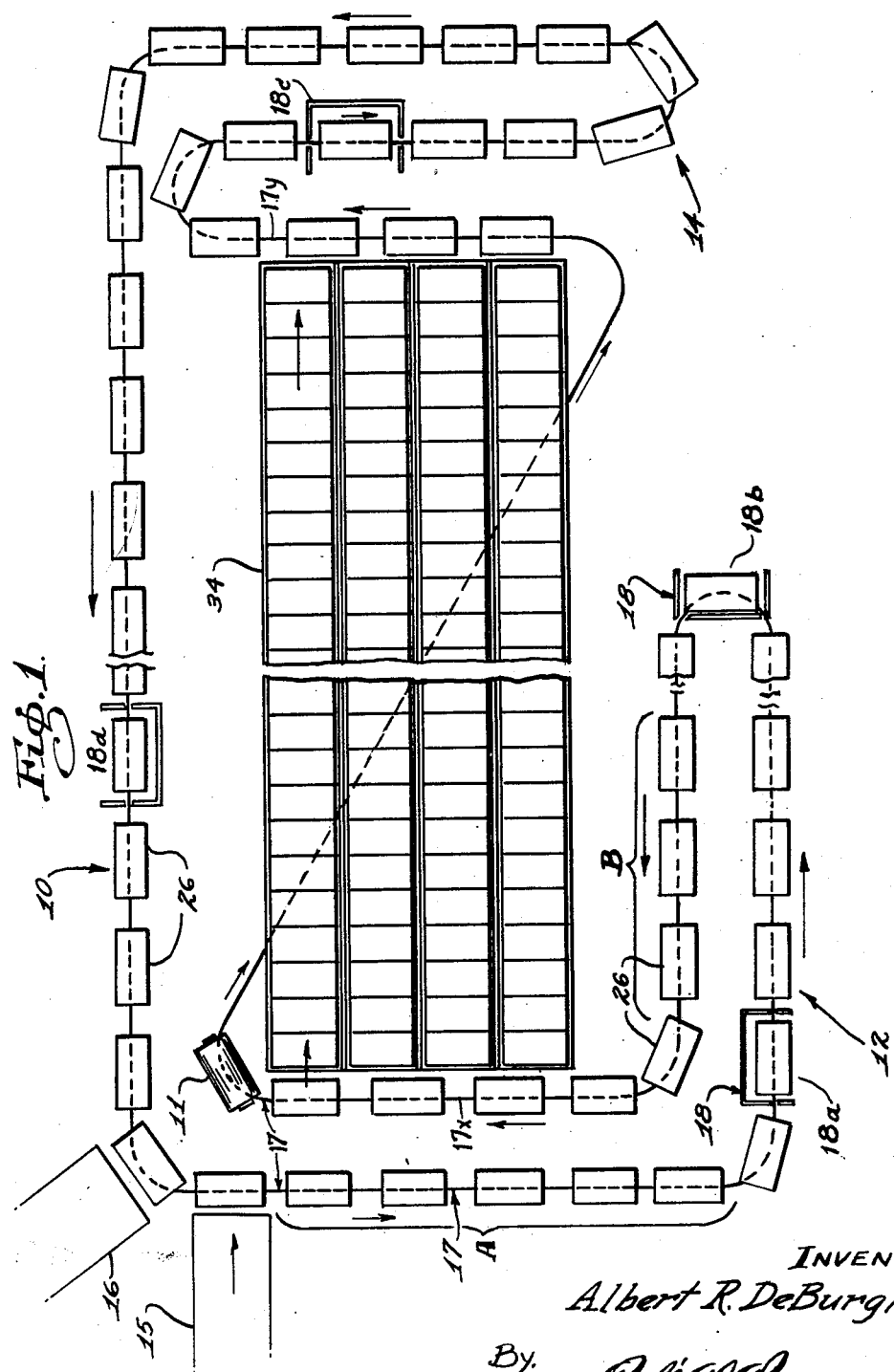
INVENTOR.
Albert R. DeBurgh
By Robt. W. Pearson
ATTORNEY.

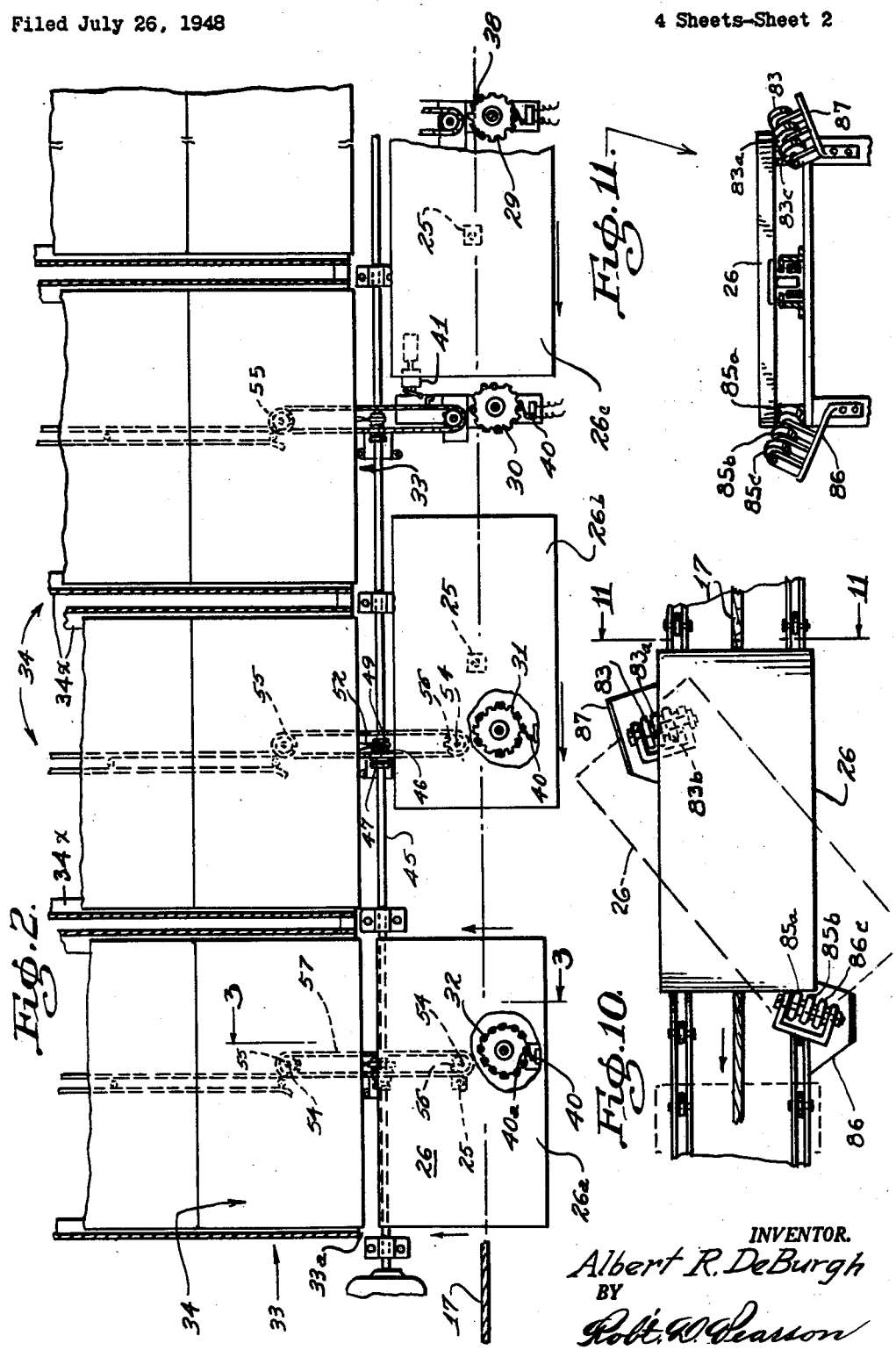

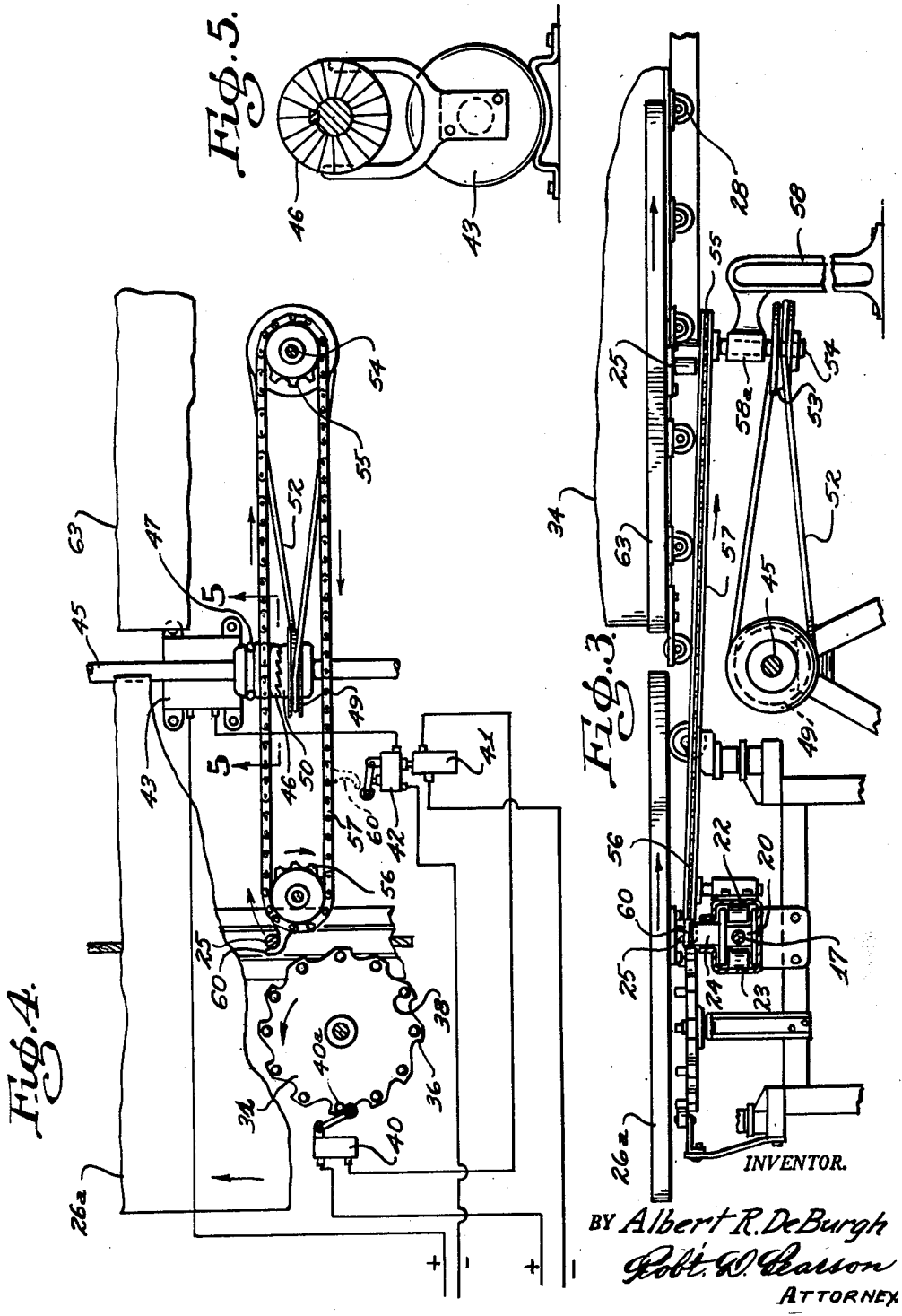

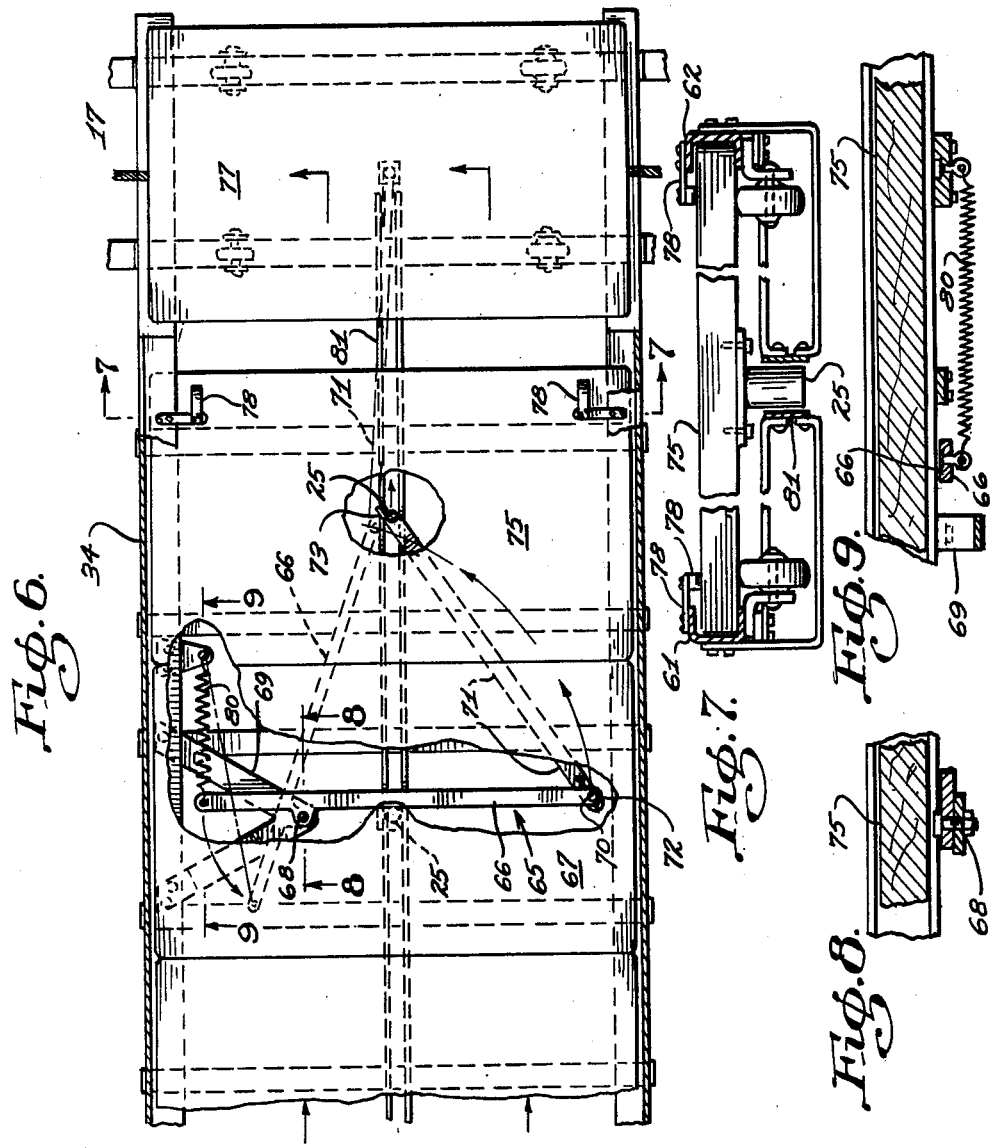

Patented June 2, 1953

2,640,607

UNITED STATES PATENT OFFICE 2,640,607

MULTIPLE CYCLE CONVEYER

Albert R. De Burgh, Redondo Beach, Calif.

Application July 26, 1948, Serial No. 40,716

21 Claims. (Cl. 214—16)

This invention relates to a machine and method for conveying through one or more cycles goods, such as furniture, parts of furniture or other items of manufacture during the manufacture, assembly and/or finishing of said goods, so as to facilitate the performance of work done in stages upon them.

In Patent No. 2,317,675 issued to me April 27, 1943 pertaining to a conveyor system, I have described and claimed an apparatus wherein a series of work-mounting pallets are connected with a conveyor passing through a succession of work stations, and means at said work stations for revolving said work-mounting pallets. Said conveyor system is of the continuous type, of which many varieties exist, wherein the unfinished work is placed on pallets and various operations are performed on it as it passes through the successive work stations finally to be unloaded as a finished product or in such state of completion as the system has been engineered to deliver.

Furthermore, through special features allowed in the claims of said patent, work is facilitated, labor saved and the quality of the completed product improved.

The conveyor covered by my Patent No. 2,317,675 has proven of great value to industry as numerous installations in large manufacturing plants in practically all parts of the United States attest.

In such a system, all handling, lifting and/or shoving during assembly or finishing is entirely eliminated, saving non-productive labor required by these activities, and the great amount of damage incident to such handling, lifting and/or shoving.

However, such a system requires a conveyor length of an average of 1600 or more feet, in most finishing operations. Experience has shown an approximate saving of 50% in labor and a great increase in production in installations that have been made. Forced dryers are required, after most applications of finishing material, so that the article being worked upon is ready for further applications of materials, or work within a reasonable length of time, and in order to keep the conveyor length and the amount of floor space occupied at a minimum.

Such a continuous type system produces a large volume of work, usually from 1000 to 1500 pieces of completed work in eight hours. But due to the large investment required, the number of forced dryers required and the large floor space occupied such a continuous type system is not practical for the smaller manufacturers producing, for example, 300 units of production per day.

A further disadvantage for the small manufacturer, is that the minimum crew required to operate this continuous type of conveyor may often be larger than the crew that he normally uses during a day's operation, without a conveyor. Moreover, the crew would be through with the day's work in possibly two or three hours. Employment of skilled workers for such short periods of time is impossible. Most plants have organized labor, and the manufacturer is not permitted to shift labor from one department to another even though this were practical, which is not the case. Furthermore the continuous type system requires a fairly consistent production volume, to produce to the best advantage. It is apparent that such a system may be operated at slower speed, and the number of employees engaged in some activities reduced; however, as it is a continuous type conveyor, a minimum crew is required to man all stations, which means that, operated at a slower speed during lessened production, unit costs increase. Therefore, such a system does not adapt itself to the changes in production occasioned by the numerous peaks and valleys of production encountered by the smaller manufacturer unable, because of limited capital or restricted warehouse space, to maintain a high production rate during business declines.

Where it is desired fully to complete a finished item, including rubbing of the finish, a very great length of conveyor is required on any continuous type system (due to the length of time needed to cool and set the finish prior to rubbing) making the inclusion of the rubbing activity a costly installation; whereas no additional conveyor length is required for the rubbing activity in the operation of the combined conveying machine of my present invention.

From the above it is apparent, as it has been for years to both the conveyor manufacturers and the furniture manufacturers, that there is an urgent need for a conveying system that will permit the smaller manufacturers to produce at a comparable cost with the larger manufacturers that are conveyorized.

However, nothing was done to correct this condition until the present invention, which has been reduced to practice in three factories within the past six months, each machine varying in form for the product, maximum production desired, floor space available, etc., and has proven the value of the invention by greatly reducing conveyor costs, requiring less floor space than other types of conveyors; in all cases reducing and in one case entirely eliminating the expensive forced drying units required on the continuous type system. This newly invented apparatus and method of using the same also reduces the number of spray booths and work stations, eliminating all handling, and/or shoving labor, and the damage incident thereto, and improving the quality of the finish. This invention pertains to a machine which when used for low volume production, obtains all the advantages and eliminates all of the disadvantages of the continuous type conveyor.

Further advantages are, through increasing the normal number of cycles, and reducing the number of operating stations functioning, the crew may be reduced, and the machine operated at the same speed of travel, as at full production, thereby maintaining the low production cost which is not possible on the continuous type conveyor.

This invention provides a cycle system of operation whereby each work conveyor passes work stations two or more times to permit the same operator to perform a different operation on the same work. The predetermined number of cycles depends upon the number of units of work, the number of operations to be performed and the time for each operation. Therefore the normal number of the cycles may be increased with the normal rate of travel speed maintained, and by causing certain stations to become inoperative and the work normally performed at said stations to be performed at the remaining active stations, a reduced volume of production at a relatively low cost results.

Provision is made to permit decreasing or increasing travel speed of the machine, and of all its component parts, so as to provide more or less time at work stations for more or less difficult work by merely setting the travel speed control indicator at the travel speed desired.

Referring to the accompanying drawings, which illustrate a preferred embodiment of the invention, Fig. 1 is a diagrammatical plan view of the system.

Fig. 2 is a fragmentary plan of a group of pallets opposite the storage section, in readiness for being moved into said section.

Fig. 3 is a section on the line 3—3 of Fig. 2.

Fig. 4 is a plan view of the structure shown in Fig. 3, with the addition of a wiring diagram, parts of the casing being broken away to disclose underlying structures.

Fig. 5 is a section on line 5—5 of Fig. 4, the scale being enlarged.

Fig. 6 is a fragmentary plan, partly in section of a plurality of pallets, one about to be removed from the storage section.

Fig. 7 is a section on line 7—7 of Fig. 6.

Figs. 8 and 9 are respectively sections on lines 8—8 and 9—9 of Fig. 6.

Fig. 10 is a plan showing the means to straighten a misaligned pallet.

Fig. 11 is a section on line 11—11 of Fig. 10.

As shown in Fig. 1 an endless conveyor 10 has a drive unit 11 with terminal spur sections 12 and 14. A loading point is shown at 15 and an unloading point at 16. As the pallets 26 move along the main cable 17 they pass a number of work stations 18, 18a, 18b, etc. located in predetermined positions according to the kind of work being done and the nature of the same, said stations being properly spaced apart to cause the various pieces of work to arrive at and depart from them at the right times. The spurs 12 and 14, reduce the space needed for the conveyor system and afford room for more work stations.

As shown in Fig. 3 the cable 17 has fixed thereto at predetermined points blocks 20, each carrying a pair of rollers 22 adapted to move in a guide 23 along the path chosen for the conveyor. Certain preselected blocks 20, are provided with upstanding lugs 24 to engage depending pins 25 fixed to the pallets 26, to move the same upon the supporting rollers 28.

As shown in Fig. 2, the pins 25 of the pallets will engage a series of rotatably mounted selector plates or disks 29, 30, 31 and 32 placed adjacent the entrances 33 of the storage section 34. As the main cable is moving continuously it is necessary to provide selector plates that will properly time the pallets to be engaged as they come into alignment with the entrances 33 of the storage section 34, through which the pallets travel between rails 34x.

To this end, selector plate 29 is provided with twelve teeth 36 and three upstanding pins 38, plate 30 has twelve teeth and four pins, plate 31 has twelve teeth and six pins, and plate 32 has twelve teeth and twelve pins.

As a pallet 26a passes plate 29, its pin 25 will engage a tooth of plate 29 and cause it to turn one-twelfth of a turn. The same thin will happen to plates 30, 31 and 32. Plate 32 having twelve pins, a one-twelfth turn will cause one of the pins 40a to actuate switch 40 and energize a small solenoid 41 (see Fig. 4) causing the reset button on switch 42 to energize large solenoid 43.

As shown in Figs. 4 and 5, it will be noted that the main drive shaft 45, which is driven through a gear reduction unit (not shown), from the main cable drive unit 11, is provided with a clutch member 46, adapted to be actuated by a yoke 47 carried by the solenoid 43.

A pulley 49, having a clutch face 50, is thus caused to be driven by shaft 45, and through belt 52, and pulley 53 the shaft 54 is rotated. Mounted upon shaft 54 is a sprocket 55 adapted to rotate sprocket 56, mounted upon guide 23, by means of chain 57. Shaft 54 is mounted within a bearing 58a carried by a standard 58.

As shown in Fig. 4, the chain 57 carries a drive hook 60 that is timed to engage the pin 25 of pallet 26a just as said pallet, while on the run 17x of the cable 17, becomes aligned with the entrance 33a (see Fig. 2), and since the chain travels at right angles to the travel of the pallets, the pallet will be moved upon the aforesaid roller 28, into guide channels 61 and 62, and into the storage section 34. Pallet 26a will engage pallet 63 and move same the width of one pallet so that pallet 26a will be completely housed in said storage section.

As shown in Fig. 3, chain 57 is mounted in a sloping manner so that after the hook 60 drives the pin 25 and the pallet 26a into its proper position in the section 34, the hook will disengage itself from the pin 25 automatically. The hook 60 continues to travel until it engages the switch 42 which de-energizes the aforesaid solenoid 43, and a spring return (not shown) in the solenoid will disengage clutch faces 46 and 50 thus stopping the movement of chain 57, this feature completing the control means for timing the operation of the electrical means.

Plate 31 has six pins so that it requires two-twelfths of a turn by pallets 26a, 26b to duplicate the operation above described. For the same reason plate 30 is provided with four pins and plate 29 with three pins.

As shown in Fig. 6, the unloading end of storage section 34 is provided with a pallet actuated linkage 65 comprising a bar 66 adapted to be engaged by the pin 25 of pallet 67. Bar 66 is pivoted at 68 to a bracket 69. At 70 an arm 71 is pivoted to the free end of said bar 66 and is normally urged in a clockwise direction by spring 72. At its free end arm 71 has a notch 73 adapted to engage the pin 25 of pallet 75, so that a movement of pallet 67 will cause the pin 25 of the latter pallet to push against bar 66 and swing it into the broken line position of Fig. 6 thus causing said arm 71 to push pallet 75 onto the run 17y of the main conveyor line into the poistion of pallet 77. A flat tension spring 78 will frictionally engage pallet 75 preventing it from moving beyond the desired position. A coil tension spring 80 will return bar 66 to its normal position. The pins 25 are shown guided within housing 34 between a pair of parallel bars 81, but the guide rails 34x may alone be relied upon to guide the pallets.

Figures 10 and 11 show how a pallet 26, that has become misalined on the cable conveyor 17 may be automatically straightened by contacting groups of rollers mounted upon supports 86 and 87 and positioned to bear up firmly against the bottoms of advancing misalined pallets. In Fig. 10, the position of a misalined pallet 26 is indicated in broken lines overlying and in part supported by the rollers of the group of rollers 85, 85a and 85b. The axes about which all these rollers rotate are identical with each other and all said axes (viewed from the side of the advancing pallet) extend at materially more than a right angle to the pallet propelling cable 17. Consequently, where a misalined pallet encounters said rollers they exert a shifting action upon it, automatically swinging it toward a truly alined relation to the cable 17.

The operation of the rearward group of rollers 83, 83a, and 83b will now readily be understood, the two groups of rollers cooperating to shift each misalined advancing pallet toward its proper position. The rear group of rollers shown act upon the front end portion of a following misalined pallet if shifted toward that side of the cable 17.

In Fig. 11 each set of pallet alining rollers is shown somewhat inclined with the rollers which are nearest to the cable 17, lower than the others. This arrangement is desirable because it causes pallets which are considerably misalined to be more forcibly contacted by one of the outer alining rollers. It is to be understood that groups of pallet alining rollers of the kind described will be stationed along the conveyor wherever needed.

In Fig. 1, where the conveyor lengths designated A and B are used in the performance of certain stages of the work, one run 17x of the cable 17 passes transversely across the entrance end of the four pallet guiding tracks within the section 34 and another run 17y thereof passes transversely across the exit end of said tracks. It will be observed that both of said runs travel in the same direction, and that the various work stations, 18a, 18b, etc., are located at intervals along the portions of the cable that precede said run 17x and follow said run 17y. Also it will be seen that mechanical means stationed at the entrance end of said section 34 has been described, said means selectively removing pallets in a predetermined equally spaced apart sequence along the length of said cable run 17x, and causing such removed pallets to be shifted laterally from said cable run into the entrance of the first of said plurality of tracks that they reach, said pallet shifting means also removing from said run of said cable, in sequence, the pallets which immediately follow or trail each aforesaid removed pallet, this sequential removal of trailed pallets being repeated to accord with the number of tracks contained in said plurality of tracks, so that all of said tracks are utilized. Likewise, the pallets crowded toward the exit end of said tracks are similarly mechanically removed from said storage section and are restored to the cable run 17y in a properly spaced correct sequence.

Although only a single storage section 34 is shown in the drawings, yet it is to be understood that a plurality of such storage sections will be provided at spaced apart locations along the length of the conveyor, whenever a sufficiently large number of work carrying pallets is required to make more storage sections desirable.

For illustration, as one means only of using the cycle method, assume a manufacturer desires to produce three hundred major pieces of work per 8-hour day; and further assume that time studies reveal that by the use of this invention, work at spray booths can be performed in one-half minute and that other activities as sanding, requiring more time, can be taken care of by providing the proper length of station and the proper number of operators.

A three cycle machine mounting three hundred pallets obviously would be indicated (as the maximum number of cycles consistent with production required and time for operations permits the minimum work crew) each cycle consisting of 150 minutes, with a 15 minute rest period between cycles, in an 8 hour production day.

*Example.—1st cycle*

Load work at station 15.
White sand at station A.
Spray wash coat at 1st booth 18a.
Spray stain and filler at 3rd booth 18b.
Flash and wipe, or pad on conveyor at B as work travels to storage conveyor 34, in this instance in a heated dryer for the long drying period required by "filler."
Cool, during time required to travel from the storage section 34 to booth 18c.
Spray sealer coat at 18c.
Dry sealer during travel (by-passing booth 18d) to station A.

*2nd cycle*

Sand sealer at A (using same crew as used for white sanding).
Spray "shade" at 18a (same operator that applied "wash coat").
Spray glaze at 18b (same operator that applied filler).
Flash and wipe glaze on conveyor B (same crew that wiped filler) as work travels to the storage 34 for the long drying period required by glaze.
Cool during time required to travel from storage section 34 to spray booth 18c.
Spray first lacquer coat at 18c (same operator that applied "sealer coat").
Dry first lacquer coat during travel (by-passing booth 18d) to station A.

3rd cycle

Touch-up, apply stencils and inspect at A using same crew as used for sanding.

Spray second coat lacquer at 18a (same operator that applied "wash coat" and "shade coat").

Spray top only with 3rd lacquer coat 18b (same operator that applied "glaze").

Work travels to storage conveyor 34 for long period of drying required by lacquer (in this case over night before rubbing).

Crew used in cycles 1 and 2 for wiping, and spray operator at booth 18c are not required for the third cycle and occupy the one and a half hours of the cycle period replacing supplies, cleaning-up, filling pressure pots, securing stock, and otherwise preparing for the next day's operations.

It is understood the above is for illustration only, that many different finishes, amounts of production and various totally unrelated work may be advantageously performed on this machine.

It is apparent that a further division of cycles may be made, for example, whereby entire crew would rub, or perform other work on a 4th cycle.

To reduce production to 150 major units per day, and retain same relative low cost, the machine would operate in the following manner:

Example.—1st cycle

Load at 15.
White sand at A.
Spray wash coat at 18a.

3rd cycle

Operator loading at 15 goes to station B to become a wiper.

Spray stain and filler at 18a (same operator that applied wash coat).

Wiping or padding of filler done at B by workers from station A that did white sanding on first cycle.

3rd cycle

Spray sealer at 18d.

Sand sealer at B using same workers that wiped filler during the second cycle.

4th cycle

Spray glaze at 18b.

Wipe glaze at B using the same workers that sanded sealer during the third cycle.

5th cycle

Spray 1st lacquer coat at 18d.

Touch-up apply stencils and inspect at B using the same workers that wiped glaze during the fourth cycle.

6th cycle

Spray 2nd lacquer coat at 18c.
Spray top only with 3rd lacquer coat at 18d.

Crew from station B, not used during 6th cycle would use 45 minutes for clean up, filling pressure pots, securing stock and otherwise preparing for the next day's operation.

Cursory thinking might suggest that the continuous type conveyor, as my Patent No. 2,317,675 could be used as a cycle system, in such applications thereof, as when pallets return to the point of origination, but more considered thought reveals:

First, that a continuous system with a capacity of 1500 units per day of 1600 feet length would mount only 200 pallets if spaced at 8 foot centers, which is the average work spacing; whereas to function as a cycle system, the mounting of 1500 work carrying pallets would be required.

Second, this invention resides in providing a method and a small, efficient, comparatively low cost conveying machine with means for varying production volume and retaining relatively low production cost for smaller production manufacturers, for whom the aforementioned continuous type system requires too large an investment, too much floor space, too many workers to operate, for the production required.

I claim:

1. In a conveying apparatus, the combination, with a storage section having a row of entrances across one end, a track leading from each of said entrances to the opposite end of said section, each of said tracks leading to an exit of a row of exits across the opposite end of said section; of an endless cable having a run which extends alongside of said row of entrances and another run which extends alongside said row of exits, mounting means for said cable, drive means connected with said cable to keep it moving while the system is operating, track means extending along said cable, a succession of work-carrying pallets mounted upon said track means and engaged by parts attached to said cable to be pushed along said track means, means for moving predetermined pallets into the desired entrances of said storage section as they pass alongside said row of entrances, said last-named means being disposed in the path of portions of the advancing pallets and having an element adapted to be engaged by the advancing pallets to start the operation of said last-named means, and a pallet ejection means within said section positioned adjacent to each exit thereof, said ejection means having an element engaged by the advance of the next following pallet to that ejected for effecting operation of said ejection means, said ejection means including mechanism for multiplying the movement of the former pallet causing the ejected pallet to move out onto the adjacent track at a greater speed than the speed of said following pallet.

2. A multiple cycle conveying machine, comprising, an endless conveyor having powered sections and at least one non-powered section, said powered sections having means for moving pallets therealong in predetermined spaced relationship, there being predetermined locations along said powered sections at which work may be performed on articles carried by said pallets, means for removing the advancing pallets from a powered section and for disposing said pallets on a non-powered section for intermittent travel thereon, the movement of said pallets on said non-powered sections being effected by said disposition of pallets thereon from a powdered section, means for removing said pallets from the non-powered section and for replacing said pallets on a powered section at their predetermined said spacing, the length of the conveyor and the number of operations to be performed at said locations on articles carried by said pallets necessitating the travel of the pallets through the locations two or more times before production is completed.

3. A multiple cycle conveying machine, comprising, an endless conveyor having powered sections and non-powered sections, said powered sections having means for moving pallets therealong in predetermined spaced relationship, there being predetermined locations along said powered sections at which work may be performed on articles carried by said pallets, means for removing the advancing pallets from a powered section and for disposing said pallets on a non-powered section for intermittent travel thereon, the movement of said pallets on said non-powered sections being effected by the disposition of pallets thereon from a powered section, means for removing said pallets from the non-powered sections and for replacing said pallets on a powered section at their predetermined said spacing, the length of the conveyor and the number of operations to be performed at said locations on articles carried by said pallets necessitating the travel of the pallets through the locations two or more times before production is completed.

4. A multiple cycle conveying machine, comprising, an endless conveyor having powered sections and non-powered sections, said powered sections having means for moving pallets therealong in predetermined spaced relationship, there being predetermined locations along said powered sections at which work may be performed on articles carried by said pallets, means for removing the advancing pallets from a powered section and for disposing said pallets transversely on a non-powered section for intermittent travel thereon, the movement of said pallets on said non-powered sections being effected by the disposition of pallets thereon from a powered section, means for removing said pallets from the non-powered sections and for replacing said pallets on a powered section at their predetermined said spacing, the length of the conveyor and the number of operations to be performed at said location on articles carried by said pallets necessitating the travel of the pallets through the locations two or more times before production is completed.

5. A multiple cycle conveying machine, comprising, an endless conveyor, power means for moving pallets along a section thereof in predetermined spaced relationship, there being predetermined locations along said section at which work may be performed on articles carried by said pallets, means for removing the advancing pallets from said section and disposing them on another section for intermittent travel thereon, the movement of said pallets on said last-named section being at a slower rate of speed and being effected by the abutting of the pallets one against the next as set in motion by disposition of the pallets on the intermittent travel section, means for removing said pallets from said last-named section and for replacing them on another section which connects with said first section and on which the pallets are again moved by said power means and in predetermined spaced relationship and at their original speed of travel past predetermined locations where work may be performed, the length of said sections and the number of operations to be performed at said locations on articles carried by said pallets necessitating the travel of the pallets through the locations two or more times before production is completed.

6. A multiple cycle conveying machine, comprising, an endless conveyor having powered sections and non-powered sections, said powered sections having means for moving pallets along said powered sections in predetermined spaced relationship, there being predetermined locations along said powered sections at which work may be performed on articles carried by said pallets, means for removing the advancing pallets from a powered section and for disposing said removed pallets on a non-powered section for intermittent travel thereon, the movement of said pallets on said non-powered sections being effected by the disposition of pallets thereon from a powered section, powered means for removing said pallets from the non-powered sections and for replacing said pallets on a powered section at their predetermined said spacing, the length of the conveyor and the number of operations to be performed at said locations on articles carried by said pallets necessitating the travel of the pallets through the locations two or more times before production is completed.

7. A multiple cycle conveying machine, comprising, an endless conveyor having powered sections and non-powered sections, means for engaging pallets to move them along said powered sections in predetermined spaced relationship, there being predetermined locations along said powered sections at which work may be performed on articles carried by said pallets, automatic means for removing the advancing pallets from a powered section and for abutting said removed pallets against each other on a non-powered section for intermittent travel at a slower speed than the pallets travel on a powered section, the movement of said pallets on said non-powered sections being effected by the abutting of the pallets thereon from a powered section, mechanical means for automatically removing said pallets from said abutted position on the non-powered sections and for replacing said pallets on a powered section at their predetermined said spacing to resume their former speed of travel, the length of the conveyor and the number of operations to be performed at said locations on articles carried by said pallets necessitating the travel of the pallets through the locations two or more times before production is completed.

8. A multiple cycle conveying machine, comprising, an endless conveyor having powered sections and non-powered sections, means for engaging rectangular pallets to move them along said powered sections lengthwise in predetermined spaced relationship, there being predetermined locations along said powered sections at which work may be performed on articles carried by said pallets, automatic means for removing the advancing pallets from a powered section and for abutting said removed pallets one against the other transversely of the conveyor on a non-powered section for intermittent travel at a slower speed than the pallets travel on a powered section, the movement of said pallets on said non-powered sections being effected by the abutting disposition of pallets thereon from a powered section, mechanical means for automatically removing said pallets from said abutted position on the non-powered sections and for replacing said pallets on a powered section at their predetermined said spacing to resume their former speed of travel, the length of the conveyor and the number of operations to be performed at said locations on articles carried by said pallets necessitating the travel of the pallets through the locations two or more times before production is completed.

9. A multiple cycle conveying machine, comprising, an endless conveyor having powered sections and non-powered sections, propelling means moving along said powered sections, means carried by said propelling means for engaging pallets to move them along said powered sections in predetermined spaced relationship, there being predetermined locations along said powered sections at which work is to be performed on articles carried by said pallets, automatic means for removing the advancing pallets from a powered section and for abutting said removed pallets against each other on a non-powered section for intermittent travel at a slower speed than the pallets travel when on a powered section, the movement of said pallets on said non-powered sections being effected by the disposition of pallets thereon from a powered section, mechanical means for automatically removing said pallets from said abutted position on the non-powered sections and for replacing said pallets on a powered section at their predetermined said spacing to resume their former speed of travel, the length of the conveyor being sufficient to load the maximum production for a predetermined period, the length of the conveyor and the number of operations to be performed at said locations on articles carried by said pallets necessitating the travel of the pallets through the locations two or more times before said production during said period of production is completed.

10. A multiple cycle conveying machine, comprising, an endless conveyor having powered sections and non-powered sections, said powered sections including a trackway, propelling means moving along said trackway, means carried by said propelling means for engaging article carrying pallets and moving them along said trackway in predetermined spaced relationship, said non-powered sections each having a trackway, one end of which is adjacent a first part of said trackway of said powered sections and the other end adjacent a second part of said trackway of said powered sections, there being predetermined locations along the trackway of said powered sections at which work is to be performed on articles carried by said pallets, automatic means for removing the advancing pallets from said first part of the trackway of said powered sections and for abutting said removed pallets against each other on one end of the trackways of said non-powered sections for intermittent travel at a slower speed than the pallets travel when on said first trackway, the movement of said pallets on the trackways of said non-powered sections being effected by disposition of pallets thereon by said automatic means, mechanical means adjacent the other ends of the trackways of said non-powered sections for automatically removing said pallets from said abutted position thereon and for replacing said pallets on said second part of the trackway of said powered sections at their said predetermined spacing to resume travel on said second part of the trackway of said powered sections, the length of all of said trackways being sufficient to load the maximum production for a predetermined period, the number of the locations and the number of operations to be performed on articles carried by said pallets necessitating the travel of the pallets through the locations two or more times before said production during said predetermined period of production is completed.

11. A multiple cycle conveying machine, comprising, an endless conveyor having powered sections and non-powered sections, said powered sections including a trackway, propelling means moving along said trackway, means carried by said propelling means for engaging article carrying pallets of rectangular shape and moving them lengthwise along said trackway in predetermined spaced relationship, said non-powered sections each having a trackway one end of which is adjacent a first part of said trackway of said powered sections and the other end adjacent a second part of said trackway of said powered sections, there being predetermined locations along the trackway of said powered sections at which work is to be performed on articles carried by said pallets, automatic means for removing the advancing pallets from said first part of the trackway of said powered sections and for abutting said removed pallets against each other on one end of the trackways of said non-powered sections and transversely of said last-named trackways for intermittent travel at a slower speed than the pallets travel when on said first trackway, the movement of said pallets on the trackways of said non-powered sections being effected by the disposition of pallets thereon by said automatic means, mechanical means adjacent the other ends of the trackways of said non-powered sections for automatically removing said pallets from said abutted position thereon and for replacing said pallets on said second part of the trackway of said powered sections at their said predetermined spacing and lengthwise thereof to resume travel on said second part of the trackway of said powered sections, the length of all of said trackways being sufficient to load the maximum production for a predetermined period, the number of the locations and the number of operations to be performed on articles carried by said pallets necessitating the travel of the pallets through the locations two or more times before said production during said predetermined period of production is completed.

12. A multiple cycle conveying machine, comprising, an endless conveyor having powered sections and a non-powered section, said powered sections having means for moving pallets along said powered sections in predetermined spaced relationship, there being predetermined locations along said powered sections at which work may be performed on articles carried by said pallets, said non-powered section including a plurality of parallel trackways for pallets to travel over from an entrance to an exit end thereof, means stationed at the entrance ends of said trackways for removing the advancing pallets from a powered section and for disposing said removed pallets on said trackways for intermittent travel thereon, the movement of said pallets on said trackways being effected by the disposition of pallets thereon from a powered section, mechanical means stationed at the exit ends of said trackways for removing said pallets from trackways and for replacing said pallets on a powered section at their predetermined said spacing, the length of the powered sections and of said trackways being sufficient to load the maximum production for a predetermined period, the length of the powered section and of said trackways and the number of operations to be performed at said locations on articles carried by said pallets necessitating the travel of the pallets through the locations two or more times before said production during said period of production is completed.

13. A multiple cycle conveying machine, comprising, an endless conveyor having powered sections and a non-powered section, said powered sections having means for moving pallets along said powered sections in predetermined spaced relationship, there being predetermined locations along said powered sections at which work may be performed on articles carried by said pallets, said non-powered section including a plurality of parallel trackways for pallets to travel over from an entrance to an exit end thereof, means stationed at the entrance ends of said trackways for removing the advancing pallets from a powered section and for forcibly disposing said removed pallets on said trackways for intermittent travel thereon, the movement of said pallets on said trackways being effected by said forcible disposition of pallets thereon from a powered section, mechanical means stationed at the exit ends of said trackways for removing said pallets from trackways and for replacing said pallets on a powered section at their predetermined said spacing, the length of the powered sections and of said trackways being sufficient to load the maximum production for a predetermined period, the number of the locations and the number of operations to be there performed on articles carried by said pallets necessitating the travel of the pallets through the locations two or more times before said production during said period of production is completed, said pallets being elongated and extending longitudinally in the direction of travel along said powered sections while moving along said powered sections, and said means for forcibly disposing the pallets on said trackways having means for positioning them transversely on said trackways.

14. A multiple cycle conveying machine, comprising an endless conveyor having powered sections and a non-powered section, said powered sections having means for moving pallets along said powered sections in predetermined spaced relationship, there being predetermined locations along said powered sections at which work may be performed on articles carried by said pallets, said non-powered section including a plurality of parallel trackways for pallets to travel over from an entrance to an exit end thereof, means stationed at the entrance ends of said trackways for removing the advancing pallets from a powered section and for forcibly disposing said removed pallets on said trackways for intermittent travel thereon, with the pallets disposed transversely on said trackways, the movement of said pallets on said trackways being effected by said forcible disposition of pallets thereon from a powered section, mechanical means stationed at the exit ends of said trackways for removing said pallets from trackways one at a time and for replacing said pallets on a powered section at their predetermined said spacing, the length of the powered sections and of said trackways being sufficient to load the maximum production for a predetermined period, the number of the locations and the number of operations to be there performed on articles carried by said pallets necessitating the travel of the pallets through the locations two or more times before said production during said period of production is completed, said mechanical means for removing said pallets from said trackways including movement-multiplying means for replacing said pallets on the powered section and for moving each pallet during such replacing operation a distance greater than its own width.

15. A multiple cycle conveying machine comprising an endless conveyor, means for portably supporting a series of elongated article supports for movement along a path defined by said conveyor, said conveyor having a section along which said article supports are adapted to be moved in a predetermined spaced relationship lengthwise of said section, means adjacent the end of said section for placing said article supports directly adjacent each other on another section of the conveyor and transversely of the path of travel therealong, the movement therealong being activated by said placing, means for placing said article supports as they terminate their travel in said adjacent transverse relationship on a section joined to said first section for movement in predetermined spaced relationship, and means for propelling said article supports in predetermined spaced relationship along said sections upon which the article supports are disposed lengthwise of the path of travel and at a greater speed than along the section on which they are disposed transversely, there being predetermined locations along the conveyor at which work can be performed on articles carried by said supports and through which said supports may be moved more than once to permit successive stages of work to be performed on articles carried by said supports.

16. In a conveying apparatus, the combination, with a storage section having a row of entrances across one end, a track leading from each of said entrances to the opposite end of said section, each of said tracks leading to an exit of a row of exits across the opposite end of said section; of an endless cable having a run which extends alongside of said row of entrances and another run which extends alongside said row of exits, mounting means for said cable, drive means connected with said cable to keep it moving while the system is operating, track means extending along said cable, a succession of work-carrying pallets mounted upon said track means and engaged by parts attached to said cable to be pushed along said track means, means for moving predetermined pallets into the desired entrances of said storage section as they pass alongside said row of entrances, said last-named means being disposed in the path of portions of the advancing pallets and having an element adapted to be engaged by the advancing pallets to start the operation of said last-named means, and a pallet ejection means within said section positioned adjacent to each exit thereof, said ejection means having an element engaged by the advance of the next following pallet to that ejected for effecting operation of said ejection means, said ejection means including a mechanism for multiplying the movement of the former pallet causing the ejected pallet to move out onto the adjacent track at a greater speed than the speed of said following pallet, and said pallet ejection means including a bar fulcrumed near one end of said storage section so as to act as a movement-multiplier, said bar being engageable between its fulcrum and opposite end by the aforesaid following pallet so that by the movement of the latter, the free end of the bar multiplies the advance movement of the last recited pallet, and a link one end of which has a pivotal spring controlled connection with said free end of said bar, said link being arranged to thrust in an endwise manner against the pallet to be ejected or unloaded.

17. A multiple cycle conveying machine, comprising an endless conveyor having powered sections and non-powered sections, said powered sections having means for moving pallets therealong in predetermined spaced relationship, there being predetermined locations along said powered sections at which work may be performed on articles carried by said pallets, means for removing the advancing pallets from a powered section and for disposing said pallets transversely on a non-powered section for intermittent travel thereon, the movement of said pallets on said non-powered sections being effected by the disposition of pallets thereon from a powered section, means for removing said pallets from the non-powered sections and for replacing said pallets on a powered section at their predetermined said spacing, the length of the conveyor and the number of operations to be performed at said locations on articles carried by said pallets necessitating the travel of the pallets through the locations two or more times before production is completed, said means for removing said pallets from the non-powered section including movement multiplying mechanism for moving each pallet a distance greater than its width.

18. A multiple cycle conveying machine, comprising, an endless conveyor having powered sections and a non-powered section, said powered sections having means for moving pallets along said powered sections in predetermined spaced relationship, there being predetermined locations along said powered sections at which work may be performed on articles carried by said pallets, said non-powered section including a plurality of parallel trackways for pallets to travel over from an entrance to an exit end thereof, means stationed at the entrance ends of said trackways for removing the advancing pallets from a powered section and for disposing said removed pallets on said trackways for intermittent travel thereon, the movement of said pallets on said trackways being effected by the disposition of pallets thereon from a powered section, mechanical means stationed at the exit ends of said trackways for removing said pallets from trackways and for replacing said pallets on a powered section at their predetermined said spacing, the length of the powered sections and of said trackways being sufficient to load the maximum production for a predetermined period, the length of the powered section and of said trackways and the number of operations to be performed at said locations on articles carried by said pallets necessitating the travel of the pallets through the locations two or more times before said production during said period of production is completed, said means for moving pallets along said powered sections, including an endless cable, one run of said cable extending transversely across the entrance ends of said trackways and another run of said cable extending across the exit ends of said trackways.

19. A multiple cycle conveying machine, comprising, an endless conveyor having powered sections and a non-powered section, said powered sections having means for moving pallets along said powered sections in predetermined spaced relationship, there being predetermined locations along said powered sections at which work may be performed on articles carried by said pallets, said non-powered section including a plurality of parallel trackways for pallets to travel over from an entrance to an exit end thereof, means stationed at the entrance ends of said trackways for removing the advancing pallets from a powered section and for disposing said removed pallets on said trackways for intermittent travel thereon, the movement of said pallets on said trackways being effected by the disposition of pallets thereon from a powered section, mechanical means stationed at the exit ends of said trackways for removing said pallets from trackways and for replacing said pallets on a powered section at their predetermined said spacing, the length of the powered sections and of said trackways being sufficient to load the maximum production for a predetermined period, the length of the powered section and of said trackways and the number of operations to be performed at said locations on articles carried by said pallets necessitating the travel of the pallets through the locations two or more times before said production during said period of production is completed, said means for moving pallets along said powered sections including an endless cable, one run of said cable extending transversely across the entrance ends of said trackways and another run of said cable extending across the exit ends of said trackways, both of said runs moving in the same direction.

20. A multiple cycle conveying machine, comprising, an endless conveyor having powered sections and a non-powered section, said powered sections having means for moving pallets along said powered sections in predetermined spaced relationship, there being predetermined locations along said powered sections at which work may be performed on articles carried by said pallets, said non-powered section including a plurality of parallel trackways for pallets to travel over from an entrance to an exit end thereof, means stationed at the entrance ends of said trackways for removing the advancing pallets from a powered section and for disposing said removed pallets on said trackways for intermittent travel thereon, the movement of said pallets on said trackways being effected by the disposition of pallets thereon from a powered section, mechanical means stationed at the exit ends of said trackways for removing said pallets from trackways and for replacing said pallets on a powered section at their predetermined said spacing, the length of the powered sections and of said trackways being sufficient to load the maximum production for a predetermined period, the length of the powered section and of said trackways and the number of operations to be performed at said locations on articles carried by said pallets necessitating the travel of the pallets through the locations two or more times before said production during said period of production is completed, said means for moving pallets along said powered sections including an endless cable, and means carried by said cable for detachably engaging said pallets.

21. A multiple cycle conveying machine, comprising, an endless conveyor having powered sections and a non-powered section, said powered sections having means for moving pallets along said powered sections in predetermined spaced relationship, there being predetermined locations along said powered sections at which work may be performed on articles carried by said pallets, said non-powered section including a plurality of parallel trackways for pallets to travel over from an entrance to an exit end thereof, means stationed at the entrance ends of said trackways for removing the advancing pallets from a powered section and for disposing said removed pallets on said trackways for intermittent travel thereon, the movement of said pallets on said trackways being effected by the disposition of pallets thereon from a powered section, mechanical means stationed at the exit ends of said trackways for removing said pallets from trackways and for replacing said pallets on a powered section at their predetermined said spacing, the length of the powered sections and of said trackways being sufficient to load the maximum production for a predetermined period, the length of the powered section and of said trackways and the number of operations to be performed at said locations on articles carried by said pallets necessitating the travel of the pallets through the locations two or more times before said production during said period of production is completed, said means at the entrance ends of said trackways being automatic and including an element positioned for engagement by an advancing pallet for effecting operation thereof, and including also mechanism for transferring onto each trackway an equal number of the pallets removed from the powered section.

ALBERT R. DE BURGH.

References Cited in the file of this patent

UNITED STATES PATENTS

| Number | Name | Date |
|---|---|---|
| 1,109,284 | Friel | Sept. 1, 1914 |
| 1,559,199 | Straight | Oct. 27, 1925 |
| 1,635,406 | Greer | July 12, 1927 |
| 1,843,281 | Hoodless | Feb. 2, 1932 |
| 1,921,109 | Webb et al. | Aug. 8, 1933 |
| 2,071,859 | Steiner | Feb. 23, 1937 |
| 2,102,995 | Coombs | Dec. 21, 1937 |
| 2,307,413 | Loux | Jan. 5, 1943 |
| 2,317,675 | De Burgh | Apr. 27, 1943 |
| 2,370,188 | Pellegrino | Feb. 27, 1945 |